US011659013B2

(12) United States Patent
Cisse et al.

(10) Patent No.: US 11,659,013 B2
(45) Date of Patent: May 23, 2023

(54) CALL DIRECTION DETECTION ON SIP IMS

(71) Applicant: EXFO Solutions SAS, Saint-Jacques-de-la-Lande (FR)

(72) Inventors: Manuel Cisse, Chanteloup (FR); Christophe Gay, Rennes (FR)

(73) Assignee: EXFO Solutions SAS, Saint-Jacques-de-la-Lande (FR)

( * ) Notice: Subject to any disclaimer, the term of this patent is extended or adjusted under 35 U.S.C. 154(b) by 0 days.

(21) Appl. No.: 17/241,205

(22) Filed: Apr. 27, 2021

(65) Prior Publication Data
US 2021/0344727 A1    Nov. 4, 2021

Related U.S. Application Data

(60) Provisional application No. 63/066,876, filed on Aug. 18, 2020, provisional application No. 63/017,601, filed on Apr. 29, 2020.

(51) Int. Cl.
*H04L 65/1104*    (2022.01)
*H04L 9/40*    (2022.01)
(Continued)

(52) U.S. Cl.
CPC ...... *H04L 65/1104* (2022.05); *H04L 63/0435* (2013.01); *H04L 65/1016* (2013.01); *H04L 65/1045* (2022.05); *H04L 65/1083* (2013.01)

(58) Field of Classification Search
CPC ............. H04L 65/1006; H04L 63/0435; H04L 65/1016; H04L 65/105; H04L 65/1083
See application file for complete search history.

(56) References Cited

U.S. PATENT DOCUMENTS 7,280,828 B1 * 10/2007 Shah ..................... H04W 48/18
455/433
7,817,635 B2    10/2010 Akhtar et al.
(Continued)

FOREIGN PATENT DOCUMENTS

WO    2008051944 A2    5/2008

OTHER PUBLICATIONS

Mlikka Poikselk et al (VoLTE End to End and Signalling in; "Voice over LTE",Feb. 1, 2012 (Feb. 1, 2012), John Wiley & Sons, Ltd, Chichester, UK, XP055082307, ISBN: 978-1-11-995168-1, pp. 99-215 (Year: 2012).*
(Continued)

*Primary Examiner* — Thu V Nguyen
*Assistant Examiner* — Aye M Aung
(74) *Attorney, Agent, or Firm* — Baratta Law PLLC; Lawrence A. Baratta, Jr.

(57) ABSTRACT

Systems and methods for call direction detection on Session Initiation Protocol (SIP) Internet Protocol (IP) Multimedia Subsystem (IMS) include monitoring SIP register messages, such as "401 UNAUTHORIZED" messages inside the IMS core to detect and log the IP addresses of the Proxy-Call Session Control Function (P-CSCF). The systems and methods include monitoring SIP registration messages; determining and storing addresses of P-CSCFs based on the monitoring of the SIP registration messages, wherein P-CSCF addresses are determined from any SIP registration messages having cipher or encryption keys therein; monitoring SIP INVITE messages; and, for a specific call associated with a SIP INVITE message, determining a direction of the specific call based on a comparison of address in the SIP INVITE messages with the stored addresses of the P-CSCFs.

17 Claims, 5 Drawing Sheets

(51) Int. Cl.
  *H04L 65/1016* (2022.01)
  *H04L 65/1083* (2022.01)
  *H04L 65/1045* (2022.01)

(56) References Cited

U.S. PATENT DOCUMENTS

| | | | |
|---|---|---|---|
| 8,170,005 | B2 | 5/2012 | Mukaiyama et al. |
| 8,472,431 | B2 | 6/2013 | Siegel et al. |
| 9,294,571 | B2 | 3/2016 | Noldus |
| 9,451,421 | B1 | 9/2016 | Allen et al. |
| 9,622,022 | B2 | 4/2017 | Yim et al. |
| 10,291,662 | B2 | 5/2019 | Kim et al. |
| 2010/0045168 | A1* | 2/2010 | Su .................. H01L 33/504 313/503 |
| 2011/0141947 | A1* | 6/2011 | Li .................. H04L 65/103 370/259 |
| 2012/0042084 | A1 | 2/2012 | Dutta et al. |
| 2012/0191721 | A1* | 7/2012 | Noldus ............ H04L 65/1073 707/741 |
| 2015/0264106 | A1 | 9/2015 | Baek et al. |
| 2019/0387030 | A1 | 12/2019 | Sridhar et al. |
| 2020/0204990 | A1* | 6/2020 | Raghunathan ........ H04L 12/189 |

OTHER PUBLICATIONS

MlikkaPoikselketal(VoLTEEndtoEndandSignallingin;"VoiceoverLTE",Feb. 1, 2012(Feb. 1, 2012),JohnWiley&Sons,Ltd,Chichester,UK,XP055082307,ISBN:978-1-11-995168-1,pp. 99-118 (Year: 2012).*
MlikkaPoikselketal(VoLTEEndtoEndandSignallingin;"VoiceoverLTE",Feb. 1, 2012(Feb. 1, 2012),JohnWiley&Sons,Ltd,Chichester,UK,XP055082307,ISBN:978-1-11-995168-1,pp. 119-138 (Year: 2012).*
MlikkaPoikselketal(VoLTEEndtoEndandSignallingin;"VoiceoverLTE",Feb. 1, 2012(Feb. 1, 2012),JohnWiley&Sons,Ltd,Chichester,UK,XP055082307,ISBN:978-1-11-995168-1,pp. 139-158 (Year: 2012).*
MlikkaPoikselketal(VoLTEEndtoEndandSignallingin;"VoiceoverLTE",Feb. 1, 2012(Feb. 1, 2012),JohnWiley&Sons,Ltd,Chichester,UK,XP055082307,ISBN:978-1-11-995168-1,pp. 159-178 (Year: 2012).*
MlikkaPoikselketal(VoLTEEndtoEndandSignallingin;"VoiceoverLTE",Feb. 1, 2012(Feb. 1, 2012),JohnWiley&Sons,Ltd,Chichester,UK,XP055082307,ISBN:978-1-11-995168-1,pp. 179-198 (Year: 2012).*
MlikkaPoikselketal(VoLTEEndtoEndandSignallingin;"VoiceoverLTE",Feb. 1, 2012(Feb. 1, 2012),JohnWiley&Sons,Ltd,Chichester,UK,XP055082307,ISBN:978-1-11-995168-1, pp. 199-215 (Year: 2012).*
Mlikka Poikselk et al ,"VoLTE End to End and Signaling" in; "Voice over LTE",Feb. 1, 2012 (Feb. 1, 2012)p. 100-108 (Year: 2012).*
Mlikka Poikselk et al ,"VoLTE End to End and Signaling" in; "Voice over LTE",Feb. 1, 2012 (Feb. 1, 2012)p. 109-118 (Year: 2012).*
Mlikka Poikselk et al ,"VoLTE End to End and Signaling" in; "Voice over LTE",Feb. 1, 2012 (Feb. 1, 2012)pag119-128 (Year: 2012).*
Mlikka Poikselk et al ,"VoLTE End to End and Signaling" in; "Voice over LTE",Feb. 1, 2012 (Feb. 1, 2012)p. 129-138 (Year: 2012).*
Mlikka Poikselk et al ,"VoLTE End to End and Signaling" in; "Voice over LTE",Feb. 1, 2012 (Feb. 1, 2012)p. 139-148 (Year: 2012).*
Mlikka Poikselk et al ,"VoLTE End to End and Signaling" in; "Voice over LTE",Feb. 1, 2012 (Feb. 1, 2012)p. 149-158 (Year: 2012).*
Mlikka Poikselk et al ,"VoLTE End to End and Signaling" in; "Voice over LTE",Feb. 1, 2012 (Feb. 1, 2012)p. 159-168 (Year: 2012).*
Mlikka Poikselk et al ,"VoLTE End to End and Signaling" in; "Voice over LTE",Feb. 1, 2012 (Feb. 1, 2012)p. 169-178 (Year: 2012).*
Mlikka Poikselk et al ,"VoLTE End to End and Signaling" in; "Voice over LTE",Feb. 1, 2012 (Feb. 1, 2012)p. 179-188 (Year: 2012).*
Mlikka Poikselk et al ,"VoLTE End to End and Signaling" in; "Voice over LTE",Feb. 1, 2012 (Feb. 1, 2012)p. 189-198 (Year: 2012).*
Mlikka Poikselk et al ,"VoLTE End to End and Signaling" in; "Voice over LTE",Feb. 1, 2012 (Feb. 1, 2012)p. 198-215 (Year: 2012).*
Moon, "Fast and Secure Session Mobility in IMS-based Vertical Handover Scenario," International Journal of Multimedia and Ubiquitous Engineering, vol. 9, No. 9, 2014, pp. 171-188.
Tang et al., "A Study of an Open Source IP Multimedia Subsystem Test Bed," ResearchGate, Jan. 2008, pp. 1-8.
Vidal et al., "A Solution for Transparent Mobility with Route Optimization in the IP Multimedia Subsystem," Manuscript, 2013, pp. 1-41.
Johnson et al., "Session Initiation Protocol (SIP) Basic Call Flow Examples," Network Working Group, Request for Comments: 3665, BCP: 75, Category: Best Current Practice, The Internet Society, Dec. 2003, pp. 1-94.
Rosenberg et al., "SIP: Session Initiation Protocol," Network Working Group, Request for Comments: 3261, Obsoletes: 2543, Category: Standards Track, The Internet Society, Jun. 2002, pp. 1-269.
Vitalis G. Ozianyi, "Charging in IP Multimedia Networks," Sep. 1, 2009, pp. 1-6.
Miikka Poikselkä et al., Chapter 5, "VoLTE End to End and Signalling," Voice over LTE: VoLTE, First Edition, Feb. 1, 2012, pp. 1-117.
Sep. 14, 2021, European Search Report for European Patent Application No. EP 21 17 0741.

* cited by examiner

CALL DIRECTION DETECTION ON SIP IMS

CROSS-REFERENCE TO RELATED APPLICATION(S)

The present disclosure claims priority to U.S. Provisional Patent Application No. 63/017,601, filed Apr. 29, 2020, and entitled "CALL DIRECTION DETECTION ON SIP IMS," and U.S. Provisional Patent Application No. 63/066,876 filed Aug. 18, 2020, and entitled "CALL DIRECTION DETECTION ON SIP IMS," the contents of both are incorporated by reference in their entirety.

FIELD OF THE DISCLOSURE

The present disclosure generally relates to wireless networking. More particularly, the present disclosure relates to systems and methods for call direction detection on Session Initiation Protocol (SIP) Internet Protocol (IP) Multimedia Subsystem (IMS).

BACKGROUND OF THE DISCLOSURE

IMS is a framework for delivering IP multimedia services and is utilized to provide voice (e.g., Voice over IP (VoIP)) or other multimedia services on user devices over a packet network. That is, fixed and mobile network operators and service providers deploy an IMS network to deliver services to mobile subscribers. Session Initiation Protocol (SIP) is the signaling protocol selected by the 3rd Generation Partnership Project (3GPP) to create and control multimedia sessions with two or more participants in an IMS network and therefore is a key element in the IMS framework. During network operation, various network entities involved in a session are configured to send information for developing a Call Detail Record (CDR). For example, a Charging Data Function (CDF) can be responsible for generating CDRs. As part of this charging functionality, originated and Terminated counters are important statistics for voice call monitoring. Conventionally, in SIP IMS, it is not possible to automatically identify if a call is mobile originated or mobile terminated. To generate statistics per originated and terminated call and to count the proper number of calls and to produce more relevant analytics, there is a need to identify the call direction.

BRIEF SUMMARY OF THE DISCLOSURE

The present disclosure relates to systems and methods for call direction detection on Session Initiation Protocol (SIP) Internet Protocol (IP) Multimedia Subsystem (IMS). Specifically, the present disclosure includes monitoring SIP register messages, such as "401 UNAUTHORIZED" messages inside the IMS core, to detect and log the IP addresses of the P-CSCF. With a log of the P-CSCF IP addresses, the present disclosure further includes monitoring SIP INVITE messages and noting the source IP address and destination IP address. A match is performed with the log of the P-CSCF IP addresses to determine the direction of the call, i.e., map the source IP address as the Originated Call (OC) and the destination IP address as the Terminated Call (TC).

In various embodiments, a method, a non-transitory computer readable medium comprising instructions to implement steps, and a processing device to perform steps are disclosed. The steps include monitoring Session Initiation Protocol (SIP) registration messages; determining and storing addresses of Proxy-Call Session Control Functions (P-CSCFs) based on the monitoring of the SIP registration messages, wherein P-CSCF addresses are determined from any SIP registration messages having cipher or encryption keys therein; monitoring SIP INVITE messages; and, for a specific call associated with a SIP INVITE message, determining a direction of the specific call based on a comparison of address in the SIP INVITE messages with the stored addresses of the P-CSCFs.

The monitoring of both the SIP registration messages and the SIP INVITE messages is in an Internet Protocol (IP) Multimedia Subsystem (IMS) core and excludes messages on a Gm interface. The monitoring of both the SIP registration messages and the SIP INVITE messages is in any of an Internet Protocol (IP) Multimedia Subsystem (IMS) core and a Gm interface. The determining the addresses of the P-CSCFs is based on Internet Protocol (IP) addresses in 401 UNAUTHORIZED messages of the SIP registration messages, with the cipher or encryption keys therein. The 401 UNAUTHORIZED messages of the SIP registration messages used for determining the P-CSCFs include only two VIA headers to distinguish between the 401 UNAUTHORIZED messages destined for the P-CSCFs and Interrogating-Call Session Control Functions (I-CSCFs). The comparison of address in the SIP INVITE messages determines whether a destination address and/or source address match one of the stored addresses of the P-CSCFs, wherein when the destination address matches one of the stored addresses, the specific call is a terminating call, and wherein when the source address matches one of the stored addresses, the specific call is an originating call. The steps can further include marking the specific call as mobile terminating if a destination address in the SIP INVITE message matches one of the stored addresses; and marking the specific call as mobile originating if a source address in the SIP INVITE message matches one of the stored addresses.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various embodiments, the present disclosure relates to systems and methods for call direction detection on Session Initiation Protocol (SIP) Internet Protocol (IP) Multimedia Subsystem (IMS). Specifically, the present disclosure includes monitoring SIP register messages, such as "401 UNAUTHORIZED" messages inside the IMS core, to detect and log the IP addresses of the P-CSCF. With a log of the P-CSCF IP addresses, the present disclosure further includes monitoring SIP INVITE messages and noting the source IP address and destination IP address. A match is performed with the log of the P-CSCF IP addresses to determine the direction of the call, i.e., map the source IP address as the Originated Call (OC) and the destination IP address as the Terminated Call (TC.

The following acronyms are utilized herein:

| Term | Definition |
| --- | --- |
| 3GPP | 3$^{rd}$ Generation Partnership Project |
| CDF | Charging Data Function |
| CDR | Call Detail Record |
| ESP | Encapsulating Security Payload |
| HSS | Home Subscriber Server |
| IMS | IP Multimedia Subsystem |
| I-CSCF | Interrogating-Call Session Control Function |
| IP | Internet Protocol |
| OC | Originated Call |
| P-CSCF | Proxy-Call Session Control Function |
| S-CSCF | Serving-Call Session Control Function |
| SIP | Session Initiation Protocol |
| TC | Terminated Call |
| Term | Definition |
| UE | User Equipment |
| URI | Uniform Resource Indicator |
| VoIP | Voice over IP |

SIP REGISTER

Figure 1:
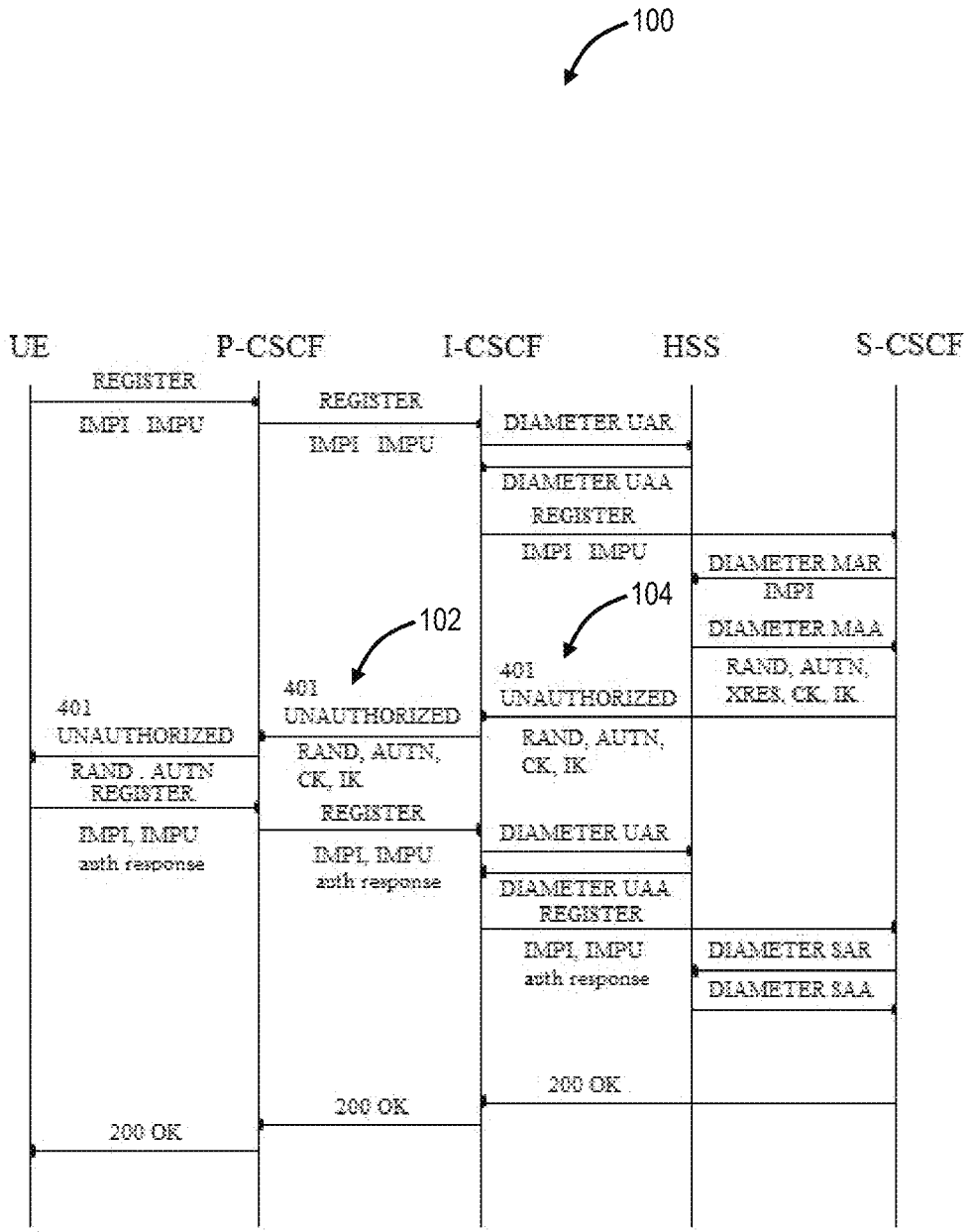
FIG. 1 is a flow diagram of a SIP registration process.

FIG. 1 is a flow diagram of a SIP registration process 100. Specifically, the SIP registration process 100 illustrates messages exchanged between a UE, P-CSCF, I-CSCF, HSS, and S-CSCF. Generally, the SIP registration process 100 is used to bind a Uniform Resource Indicator (URI) with a SIP user. Examples and details of the SIP registration process are described in RFC 3665 "Session Initiation Protocol (SIP) Basic Call Flow Examples," December 2003, the contents of which are incorporated by reference. Details of SIP are described in RFC 3261, "SIP: Session Initiation Protocol," June 2002, the contents of which are incorporated by reference.

The present disclosure includes matching between a log of the P-CSCF IP addresses and the source/destination IP addresses of INVITE messages to determine call direction.

An example of a REGISTER message includes, from RFC 3665:

F1 REGISTER Bob->SIP Server
REGISTER sips:ss2.biloxi.example.com SIP/2.0
Via: SIP/2.0/TLS client.biloxi.example.com:5061; branch=z9hG4bKnashds7
Max-Forwards: 70
From: Bob<sips:bob@biloxi.example.com>; tag=a73kszlfl
To: Bob<sips:bob@biloxi.example.com>
Call-ID: 1j9FpLxk3uxtm8tn@biloxi.example.com CSeq: 1 REGISTER
Contact: <sips:bob@client.biloxi.example.com>
Content-Length: 0

An example of a 401 UNAUTHORIZED message includes, from RFC 3665:

F2 401 Unauthorized SIP Server->Bob
SIP/2.0 401 Unauthorized
Via: SIP/2.0/TLS client.biloxi.example.com:5061; branch=z9hG4bKnashds7
;received=192.0.2.201
From: Bob<sips:bob@biloxi.example.com>; tag=a73kszlfl
To: Bob<sips:bob@biloxi.example.com>; tag=1410948204
Call-ID: 1j9FpLxk3uxtm8tn@biloxi.example.com
CSeq: 1 REGISTER
WVWV-Authenticate: Digest realm="atlanta.example.com", qop="auth",
nonce="ea9c8e88df84f1cec4341ae6cbe5a359",
opaque=" ", stale=FALSE, algorithm=MD5
Content-Length: 0

P-CSCF Detection and Self-Learning

The present disclosure includes detecting and learning all of the P-CSCFs in the network, based on the SIP registration process 100. As is known in the art, the P-CSCF is a SIP proxy that is the first point of contact in the IMS network. The present disclosure includes maintaining a database of the IP addresses of all P-CSCFs. The database is maintained by monitoring SIP registration messages, specifically the 401 UNAUTHORIZED messages, to detect the IP addresses.

During the SIP registration process 100, 401 UNAUTHORIZED messages 102 inside the IMS core contains a cipher key (CK), and this message is always destined to the P-CSCF. Note, the 401 UNAUTHORIZED messages 102 are inside the IMS core and not the one on the Gm interface (between the UE and the P-CSCF in FIG. 1). The cipher key is used in IMS security. The cipher key is also referred to as encryption keys and the like. It is the presence of the keys that indicates the 401 UNAUTHORIZED messages 102 are destined for the P-CSCF, and this allows the designation of the destination IP address of the 401 UNAUTHORIZED messages 102 to be used as an IP address of a P-CSCF. That is, based on the presence of the keys in the 401 UNAUTHORIZED messages 102, it can be assumed the destination is the P-CSCF.

Accordingly, the present disclosure includes flagging, storing, monitoring, etc. any 401 UNAUTHORIZED messages 102 in the IMS core having the keys therein, and storing the destination IP address in a database that includes IP addresses of P-CSCFs in the network.

In the SIP registration process 100, the S-CSCF and I-CSCF may be separate from one another and from the P-CSCF, as is shown in FIG. 1. In this case, there are multiple 401 UNAUTHORIZED messages 102 in the IMS core. That is, there are 401 UNAUTHORIZED messages 104 from the S-CSCF to the I-CSCF and 401 UNAUTHORIZED messages 102 from the I-CSCF to the P-CSCF. Of note, the 401 UNAUTHORIZED messages 102 are destined for the P-CSCF, whereas the 401 UNAUTHORIZED messages 104 are destined for the I-CSCF.

Note, all 401 UNAUTHORIZED (401 UNAUTHORIZED messages 102, 104 in the example) are destinated to P-CSCF, but only the 401 UNAUTHORIZED messages 102 have the IP address of the P-CSCF as a destination. Thus, only the 401 UNAUTHORIZED messages 102 are used to identify the P-CSCF and learn their IP addresses.

It is possible to identify and distinguish the 401 UNAUTHORIZED messages 104 from the 401 UNAUTHORIZED messages 102 using VIA headers in the associated 401 UNAUTHORIZED messages 102, 104. The 401 UNAUTHORIZED messages 102 will have exactly two VIA headers. The VIA header identifies the protocol name, protocol version, transport type, IP address of the UAC, and the protocol port used for a request. The 401 UNAUTHORIZED messages 102 will have exactly two VIA headers therein, such as, e.g.:

Via: SIP/2.0/UDP erlang.bell-telephone.com:5060; branch=z9hG4bK87asdks7
Via: SIP/2.0/UDP 192.0.2.1:5060;received=192.0.2.207 ;branch=z9hG4bK77asjd Thus, the present disclosure can include distinguishing the 401 UNAUTHORIZED messages 102 from the 401 UNAUTHORIZED messages 104 by the two VIA headers. All of the 401 UNAUTHORIZED messages 102 can be used to identify the IP addresses of the P-CSCF, and the 401 UNAUTHORIZED messages 104 can be ignored for this purpose.

The present disclosure can use the destination IP addresses from the 401 UNAUTHORIZED messages 102 to detect P-CSCFs. These IP addresses are stored in the database for future use, and this process can continue over time to flag new P-CSCFs. Also, existing entries in the database can age out where they are not seen over a period of time, where P-CSCFs change IP addresses or are no longer operational.

SIP INVITE

Figure 2:
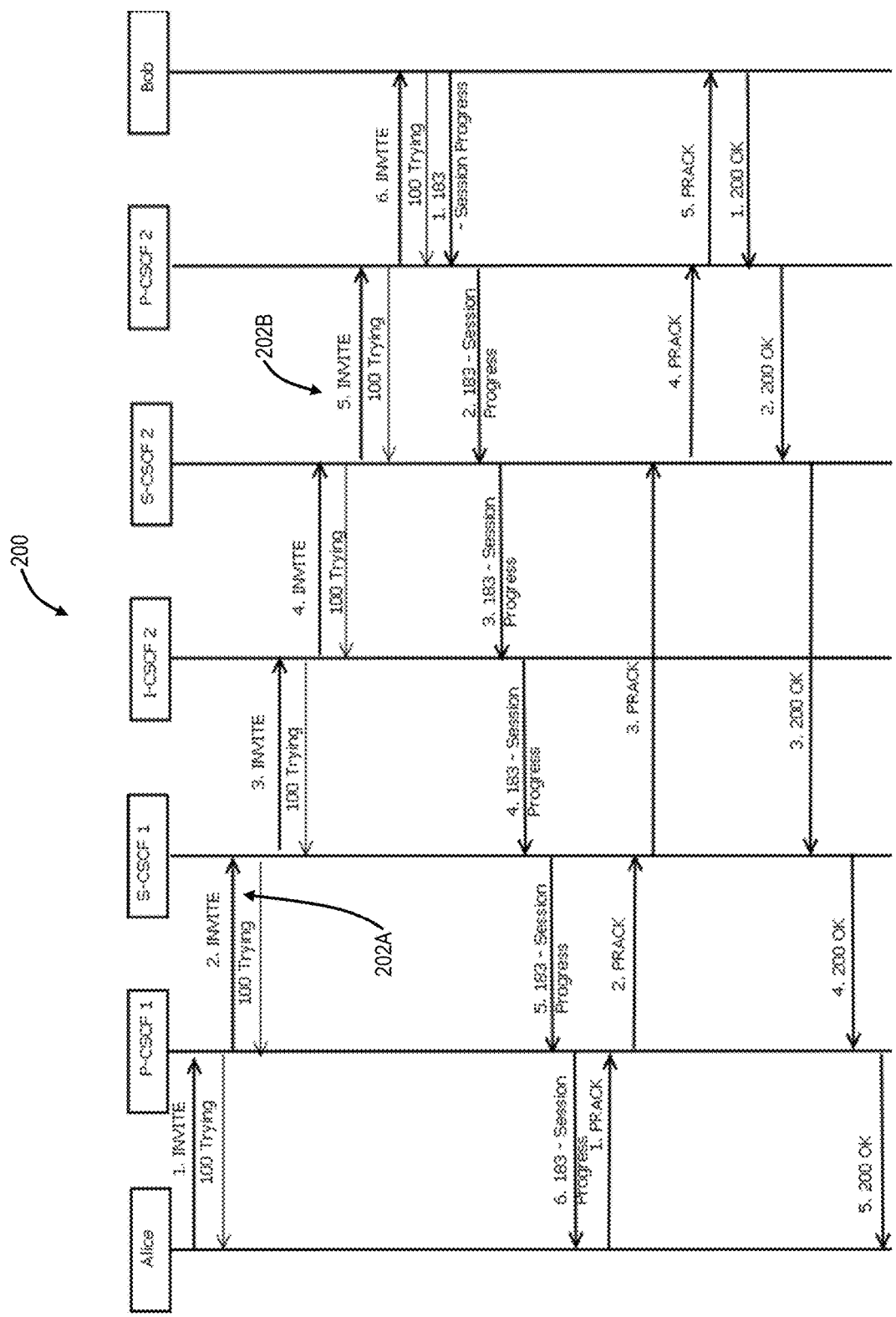
FIG. 2 is a flow diagram of a SIP INVITE process.

FIG. 2 is a flow diagram of a SIP INVITE process 200. Specifically, the SIP INVITE process 200 illustrates messages exchanged between an originated caller, originated P-CSCF, originated S-CSCF, terminating I-CSCF, terminating S-CSCF, terminating P-CSCF, and the terminating caller ("called").

The present disclosure includes flagging, monitoring, and analyzing SIP INVITE messages 202 (labeled as SIP INVITE messages 202A, 202B for Alice and Bob, respectively), and this can be for a single call. The IP addresses in the SIP INVITE messages 202 can be matched against the database. There can be three results from this matching—

(1) Source IP address in the SIP INVITE message 202 matches an IP address in the database→this SIP INVITE message 202 corresponds to the Originated Call (OC);

(2) Destination IP address in the SIP INVITE message 202 matches an IP address in the database→this SIP INVITE message 202 corresponds to the Terminated Call (TC);

(3) Neither IP address in the SIP INVITE message 202 matches an IP address in the database→this SIP INVITE message 202 is one of the intermediate messages between C-SCFs and is not used to designate the OC or TC.

That is, the direction of the call is determined from the source/destination address in the SIP INVITE message 202 matching an address that is known to be a P-CSCF. In the SIP INVITE process 200, for example, a SIP INVITE message 202A from the P-CSCF 1 in the IMS core associated with Alice will have a source IP address for the P-CSCF 1. Thus, the Alice side of this call will be marked as OC, i.e., the source IP address in the SIP INVITE message 202A matches a stored address for the P-CSCF 1. A SIP INVITE message 202B to the P-CSCF 2 in the IMS core associated with Bob will have a destination IP address for the P-CSCF 2. Thus, the Bob side of this call will be marked as TC, i.e., the destination IP address in the SIP INVITE message 202B matches a stored address for the P-CSCF 2. Note, this approach here is based on monitoring the SIP INVITE messages 202A, 202B in the IMS core (between P-CSCFs). The convention is the opposite when monitoring on the Gm interface. For example, a destination IP address on the Gm interface for a SIP INVITE message matching a P-CSCF would be the OC, and a source IP address on the Gm interface for a SIP INVITE message matching a P-CSCF would be the TC.

This information is used in a CDR to denote the call direction, whether the call is mobile-originated or mobile-terminated, etc.

Gm Interface

Note, in an embodiment, the SIP INVITE messages 202 are only flagged, monitored, analyzed, etc. in the IMS core, not ones on the Gm interface. Of course, in another embodiment, it is possible to monitor messages on the Gm interface as well. The monitoring aspect is based on where a monitoring system has visibility. The various techniques described herein apply as well to the Gm interface, namely identifying P-CSCFs and their IP addresses and determining call direction based on SIP INVITE messages and the source/destination IP addresses therein.

Figure 3:
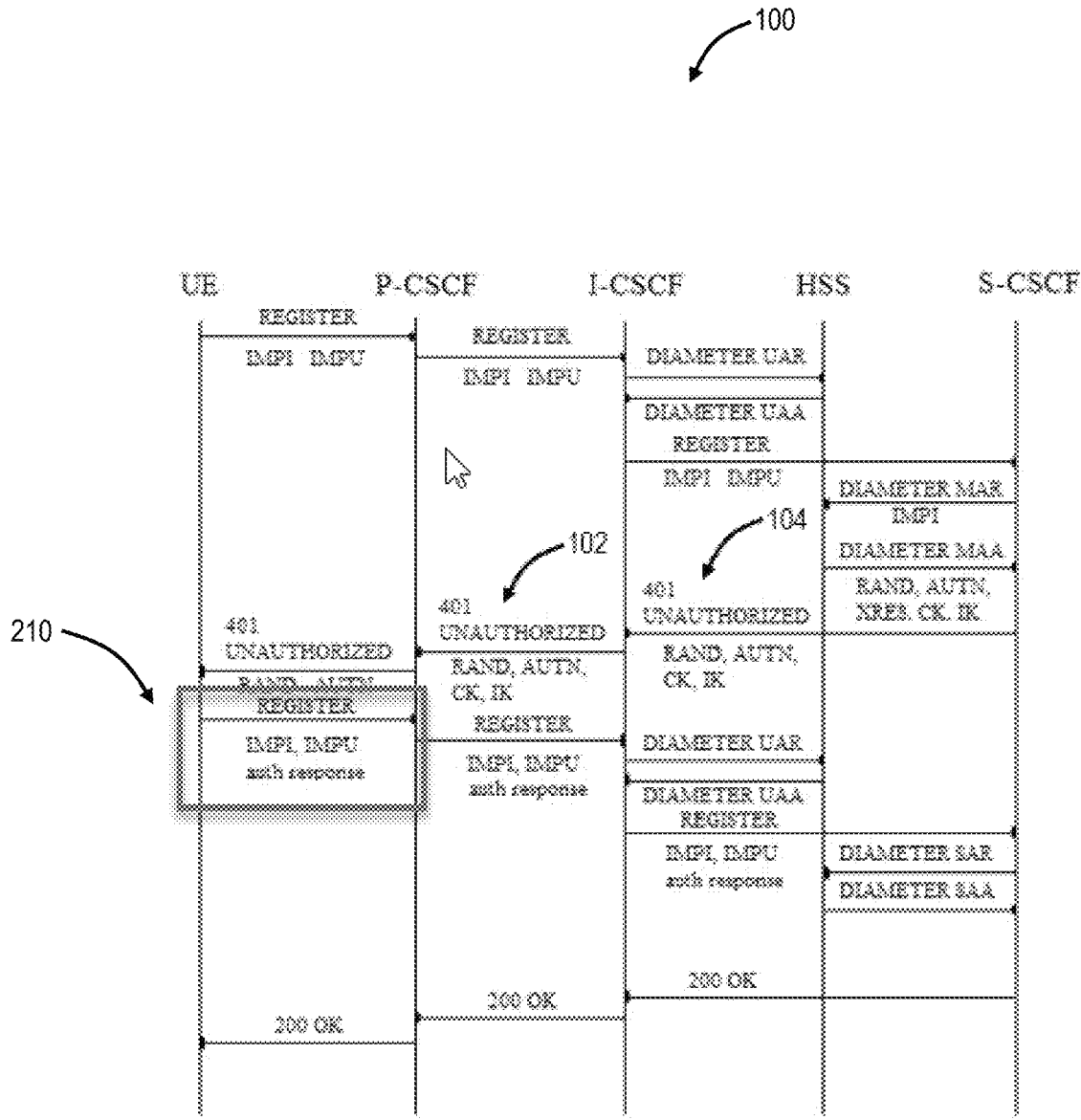
FIG. 3 is a flow diagram of the SIP registration process of FIG. 1 illustrating a REGISTER message.

For identifying P-CSCFs on the Gm interface, the destination IP address in REGISTER messages 210 can be saved as identified P-CSCFs. The REGISTER message 210 comes after the 401 UNAUTHORIZED message and will have an Encapsulating Security Payload (ESP) layer. FIG. 3 is a flow diagram of the SIP registration process 100 illustrating the REGISTER message 210. This step is identical to the identification of P-CSCFs in the IMS core based on the 401 UNAUTHORIZED messages 102 described above.

Also, the SIP INVITE messages on the Gm interface can be used to detect call direction, as mentioned above.

Process

Figure 4:
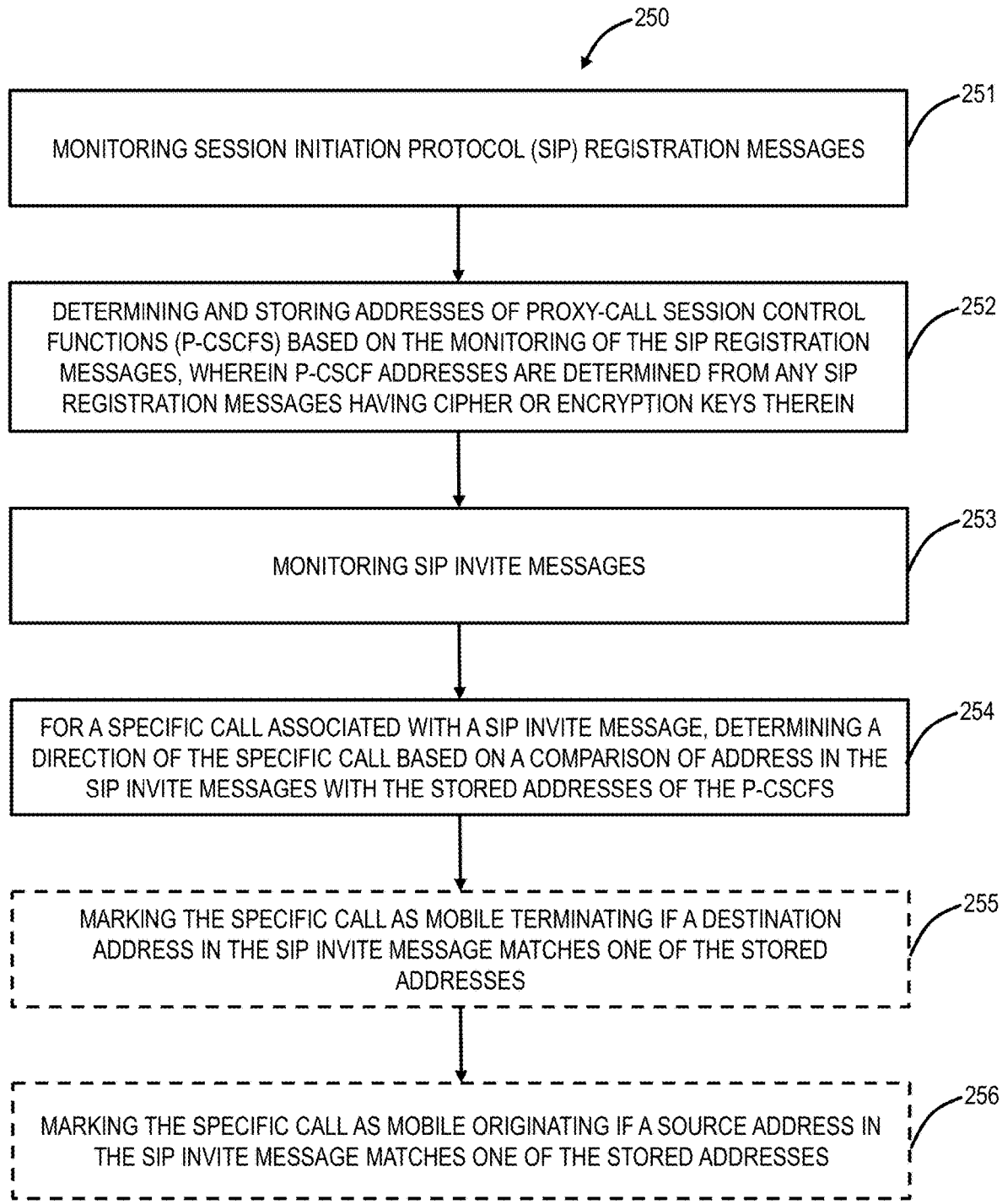
FIG. 4 is a flow chart of a call direction detection process.

FIG. 4 is a flow chart of a call direction detection process 250. The call direction detection process 250 contemplates implementation as a method, as instructions stored on a non-transitory computer-readable medium, and via an apparatus such as a processing device 300 as described in FIG. 5. The call direction detection process 250 includes monitoring Session Initiation Protocol (SIP) registration messages (step 251); determining and storing addresses of Proxy-Call Session Control Functions (P-CSCFs) based on the monitoring of the SIP registration messages, wherein P-CSCF addresses are determined from any SIP registration messages having cipher or encryption keys therein (step 252); monitoring SIP INVITE messages (step 253); and, for a specific call associated with a SIP INVITE message, determining a direction of the specific call based on a comparison of address in the SIP INVITE messages with the stored addresses of the P-CSCFs (step 254).

The monitoring steps 251, 253 can be in Internet Protocol (IP) Multimedia Subsystem (IMS) core only, excluding messages on a Gm interface. Alternatively, the monitoring steps 251, 253 may include the Gm interface, including only the Gm interface.

For monitoring in the IMS core only, the determining the addresses of the P-CSCFs is based on Internet Protocol (IP) addresses in 401 UNAUTHORIZED messages of the SIP registration messages, with the cipher or encryption keys therein. The 401 UNAUTHORIZED messages of the SIP registration messages used for determining the P-CSCFs include only two VIA headers to distinguish between the 401 UNAUTHORIZED messages destined for the P-CSCFs and Interrogating-Call Session Control Functions (I-CSCFs).

The comparison of address in the SIP INVITE messages determines whether a destination address and/or source address match one of the stored addresses of the P-CSCFs, wherein when the destination address matches one of the stored addresses, the specific call is a terminating call, and wherein when the source address matches one of the stored addresses, the specific call is an originating call.

The call direction detection process 250 can include marking the specific call as mobile terminating if a destination address in the SIP INVITE message matches one of the stored addresses (step 255); and marking the specific call as mobile originating if a source address in the SIP INVITE message matches one of the stored addresses (step 256).

Example Processing Device Architecture

Figure 5:
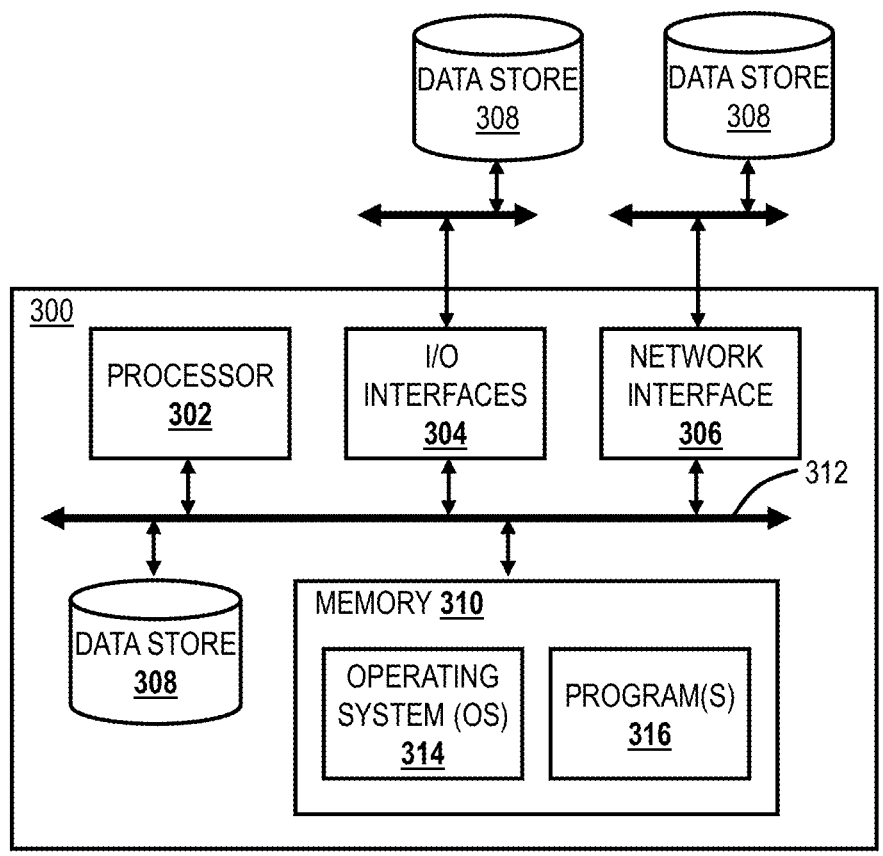
FIG. 5 is a block diagram of a processing device.

FIG. 5 is a block diagram of a processing device 300. The processing device 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 5 depicts the processing device 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example, but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the processing device 300, a semiconductor-based microprocessor (in the form of a microchip or chipset), or generally any device for executing software instructions. When the processing device 300 is in operation, the processor 302 is configured to execute software stored within the memory 310, to communicate data to and from the memory 310, and to generally control operations of the processing device 300 pursuant to the software instructions. The I/O interfaces 304 may be used to receive user input from and/or for providing system output to one or more devices or components. The user input may be provided via, for example, a keyboard, touchpad, and/or a mouse. System output may be provided via a display device and a printer (not shown). I/O interfaces 304 may include, for example, a serial port, a parallel port, a Small Computer System Interface (SCSI), a Serial ATA (SATA), a fiber channel, InfiniBand, iSCSI, a PCI Express interface (PCI-x), an Infrared (IR) interface, a Radio Frequency (RF) interface, a Universal Serial Bus (USB) interface, or the like.

The network interface 306 may be used to enable the processing device 300 to communicate over the network 120, etc. The network interface 306 may include, for example, an Ethernet card or adapter or a Wireless Local Area Network (WLAN) card or adapter. The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 308 may be located internal to the processing device 300, such as, for example, an internal hard drive connected to the local interface 312 in the processing device 300. Additionally, in another embodiment, the data store 308 may be located external to the processing device 300, such as, for example, an external hard drive connected to the I/O interfaces 304 (e.g., SCSI or USB connection). In a further embodiment, the data store 308 may be connected to the processing device 300 through a network, such as, for example, a network-attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services.

The one or more programs 316 may be configured to implement the various processes, algorithms, methods, techniques, etc. described herein, such as with respect call direction detection. Generally, the processing device 300 is configured to flag, monitor, analyze, store, etc. the messages 102, 104, 202, manage the database of P-CSCF IP addresses, and identify call direction in SIP IMS using the database.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, processor, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A non-transitory computer-readable medium having instructions stored thereon for programming a processing device to perform steps of:
   monitoring Session Initiation Protocol (SIP) registration messages, by the processing device in a monitoring system that is not involved in exchanging the SIP registration messages and has limited visibility thereof;
   determining and storing addresses of Proxy-Call Session Control Functions (P-CSCFs), in a log in the monitoring system, based on the monitoring of the SIP registration messages, wherein P-CSCF addresses are determined from any SIP registration messages having cipher or encryption keys therein, wherein the determining the addresses of the P-CSCFs is based on Internet Protocol (IP) addresses in 401 UNAUTHORIZED messages of the SIP registration messages, with the cipher or encryption keys therein;
   monitoring SIP INVITE messages; and
   for a specific call associated with a SIP INVITE message, determining a direction of the specific call based on a comparison of address in the SIP INVITE messages with the stored addresses of the P-CSCFs in the log.

2. The non-transitory computer-readable medium of claim 1, wherein the monitoring of both the SIP registration messages and the SIP INVITE messages is in an Internet Protocol (IP) Multimedia Subsystem (IMS) core and excludes messages on a Gm interface.

3. The non-transitory computer-readable medium of claim 1, wherein the monitoring of both the SIP registration messages and the SIP INVITE messages is in any of an Internet Protocol (IP) Multimedia Subsystem (IMS) core and a Gm interface.

4. The non-transitory computer-readable medium of claim 1, wherein the 401 UNAUTHORIZED messages of the SIP registration messages used for determining the P-CSCFs include only two VIA headers to distinguish between the 401 UNAUTHORIZED messages destined for the P-CSCFs and Interrogating-Call Session Control Functions (I-CSCFs).

5. The non-transitory computer-readable medium of claim 1, wherein the comparison of address in the SIP INVITE messages determines whether a destination address and/or source address match one of the stored addresses of the P-CSCFs,
   wherein when the destination address matches one of the stored addresses, the specific call is a terminating call, and
   wherein when the source address matches one of the stored addresses, the specific call is an originating call.

6. The non-transitory computer-readable medium of claim 1, wherein the steps further include
   marking the specific call as mobile terminating if a destination address in the SIP INVITE message matches one of the stored addresses; and
   marking the specific call as mobile originating if a source address in the SIP INVITE message matches one of the stored addresses.

7. A method comprising:
   monitoring Session Initiation Protocol (SIP) registration messages, by a monitoring system that is not involved in exchanging the SIP registration messages and has limited visibility thereof;
   determining and storing addresses of Proxy-Call Session Control Functions (P-CSCFs), in a log in the monitoring system, based on the monitoring of the SIP registration messages, wherein P-CSCF addresses are determined from any SIP registration messages having cipher or encryption keys therein, wherein the determining the addresses of the P-CSCFs is based on Internet Protocol (IP) addresses in 401 UNAUTHORIZED messages of the SIP registration messages, with the cipher or encryption keys therein;
   monitoring SIP INVITE messages; and
   for a specific call associated with a SIP INVITE message, determining a direction of the specific call based on a comparison of address in the SIP INVITE messages with the stored addresses of the P-CSCFs in the log.

8. The method of claim 7, wherein the monitoring of both the SIP registration messages and the SIP INVITE messages is in an Internet Protocol (IP) Multimedia Subsystem (IMS) core and excludes messages on a Gm interface.

9. The method of claim 7, wherein the monitoring of both the SIP registration messages and the SIP INVITE messages is in any of an Internet Protocol (IP) Multimedia Subsystem (IMS) core and a Gm interface.

10. The method of claim 7, wherein the 401 UNAUTHORIZED messages of the SIP registration messages used for determining the P-CSCFs include only two VIA headers to distinguish between the 401 UNAUTHORIZED messages destined for the P-CSCFs and Interrogating-Call Session Control Functions (I-CSCFs).

11. The method of claim 7, wherein the comparison of address in the SIP INVITE messages determines whether a destination address and/or source address match one of the stored addresses of the P-CSCFs,
    wherein when the destination address matches one of the stored addresses, the specific call is a terminating call, and
    wherein when the source address matches one of the stored addresses, the specific call is an originating call.

12. The method of claim 7, further comprising marking the specific call as mobile terminating if a destination address in the SIP INVITE message matches one of the stored addresses; and
    marking the specific call as mobile originating if a source address in the SIP INVITE message matches one of the stored addresses.

13. A processing device in a monitoring system comprising:
    one or more processors; and
    memory storing instructions that, when executed, cause the one or more processors to obtain monitored Session Initiation Protocol (SIP) registration messages, wherein the monitoring system is not involved in exchanging the SIP registration messages and has limited visibility thereof;
    determine and store addresses of Proxy-Call Session Control Functions (P-CSCFs), in a log in the monitoring system, based on the monitoring of the SIP registration messages, wherein P-CSCF addresses are determined from any SIP registration messages having cipher or encryption keys therein, and wherein the addresses of the P-CSCFs are determined based on Internet Protocol (IP) addresses in 401 UNAUTHOR- IZED messages of the SIP registration messages, with the cipher or encryption keys therein;

obtain monitored SIP INVITE messages; and for a specific call associated with a SIP INVITE message, determine a direction of the specific call based on a comparison of address in the SIP INVITE messages with the stored addresses of the P-CSCFs in the log.

14. The processing device of claim 13, wherein the monitored SIP registration messages and the monitored SIP INVITE messages are from an Internet Protocol (IP) Multimedia Subsystem (IMS) core and exclude messages on a Gm interface.

15. The processing device of claim 13, wherein the monitored SIP registration messages and the monitored SIP INVITE messages are from any of an Internet Protocol (IP) Multimedia Subsystem (IMS) core and a Gm interface.

16. The processing device of claim 13, wherein the 401 UNAUTHORIZED messages of the SIP registration messages used for determining the P-CSCFs include only two VIA headers to distinguish between the 401 UNAUTHORIZED messages destined for the P-CSCFs and Interrogating-Call Session Control Functions (I-CSCFs).

17. The processing device of claim 13, wherein the comparison of address in the SIP INVITE messages determines whether a destination address and/or source address match one of the stored addresses of the P-CSCFs, wherein when the destination address matches one of the stored addresses, the specific call is a terminating call, and wherein when the source address matches one of the stored addresses, the specific call is an originating call.

* * * * *